United States Patent
Morales

(10) Patent No.: US 12,067,314 B1
(45) Date of Patent: Aug. 20, 2024

(54) INTELLIGENT PAPER TRAY CONFIGURATION FOR PRINTING DEVICE

(71) Applicant: Kyocera Document Solutions Inc., Osaka (JP)

(72) Inventor: Javier A. Morales, Rochester, NY (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 18/223,235

(22) Filed: Jul. 18, 2023

(51) Int. Cl.
 *G06F 3/12* (2006.01)

(52) U.S. Cl.
 CPC .......... *G06F 3/1254* (2013.01); *G06F 3/1204* (2013.01); *G06F 3/1205* (2013.01); *G06F 3/1217* (2013.01); *G06F 3/1255* (2013.01); *G06F 3/1258* (2013.01); *G06F 3/1259* (2013.01)

(58) Field of Classification Search
 CPC .... G06F 3/1254; G06F 3/1204; G06F 3/1205; G06F 3/1217; G06F 3/1255; G06F 3/1258; G06F 3/1259
 See application file for complete search history.

(56) References Cited

U.S. PATENT DOCUMENTS

| | | | | |
|---|---|---|---|---|
| 5,835,820 | A * | 11/1998 | Martin | G03G 15/6502 399/389 |
| 10,402,128 | B2 | 9/2019 | Yamakawa | |
| 2016/0378414 | A1* | 12/2016 | Oya | G06F 3/1234 358/1.15 |
| 2018/0189617 | A1* | 7/2018 | Feng | G06K 15/4025 |
| 2019/0138252 | A1* | 5/2019 | Okada | G06F 3/1253 |

OTHER PUBLICATIONS

English Machine Translation of JP 2015-044340-A (Masuko, Published Mar. 12, 2015) (Year: 2015).*
English Machine Translation of JP 2017-064931-A (Namba, Published Apr. 6, 2017) (Year: 2017).*

* cited by examiner

*Primary Examiner* — Juan M Guillermety
(74) *Attorney, Agent, or Firm* — Millen, White, Zelano & Branigan P.C.; William F. Nixon

(57) ABSTRACT

A printing system includes a printing device having paper trays. Each paper tray includes loaded paper and has one or more paper tray settings. The paper tray settings are defined for each paper tray. A paper tray setting is defined to reconfigure an installed paper tray to apply the setting. The reconfiguration of the paper tray is delayed until an action is completed, such as opening the paper tray to load the paper corresponding to the paper tray setting or the current print job is complete. After the action, the paper tray setting is applied to reconfigure the paper tray. Printing operations are enabled using the reconfigured paper tray.

19 Claims, 7 Drawing Sheets

INTELLIGENT PAPER TRAY CONFIGURATION FOR PRINTING DEVICE

FIELD OF THE INVENTION

The present invention relates to a printing device having an intelligent paper tray configuration for improved workflow during printing operations.

DESCRIPTION OF THE RELATED ART

The configuration and reconfiguration of paper trays at a printing device is one of the activities that production print operators perform repeatedly during printing operations. This aspect especially may be true for commercial printing devices that offer customers a choice of dozens, if not hundreds, of different papers or paper media. In these instances, operators may reconfigure trays for a majority of jobs. Tray reconfiguration, however, as an operation leaves a lot of room for optimization. This optimization could substantially improve press operator efficiency as well as press profitability as printing devices have their profitability determined by their overall equipment effectiveness (OEE).

SUMMARY OF THE INVENTION

A printing method is disclosed. The printing method includes defining a paper tray setting for at least one paper tray at a printing device. The printing method also includes delaying configuration of the at least one paper tray with the paper tray setting. The method also includes detecting that the at least one paper tray is opened. The method also includes configuring the at least one paper tray with the paper tray setting. The method also includes enabling printing operations at the printing device with the configured at least one paper tray.

A method for performing printing operations is disclosed. The method includes performing a current print job at a printing device. The method also includes defining a paper tray setting for at least one paper tray at a printing device. The method also includes delaying configuration of the at least one paper tray with the paper tray setting. The method also includes determining the current print job is complete at the printing device. The method also includes configuring the at least one paper tray with the paper tray setting. The method also includes enabling printing operations at the printing device with the configured at least one paper tray.

A method for performing printing operations is disclosed. The method includes performing a current print job at a printing device. The method also includes defining a paper tray setting applicable to a subsequent print job for at least one paper tray at the printing device. The method also includes determining that the current print job is complete. The method also includes detecting the at least one paper tray is opened. The method also includes configuring the at least one paper tray with the paper tray setting. The method also includes performing printing operations for the subsequent print job using the paper tray setting.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Figure 1A:
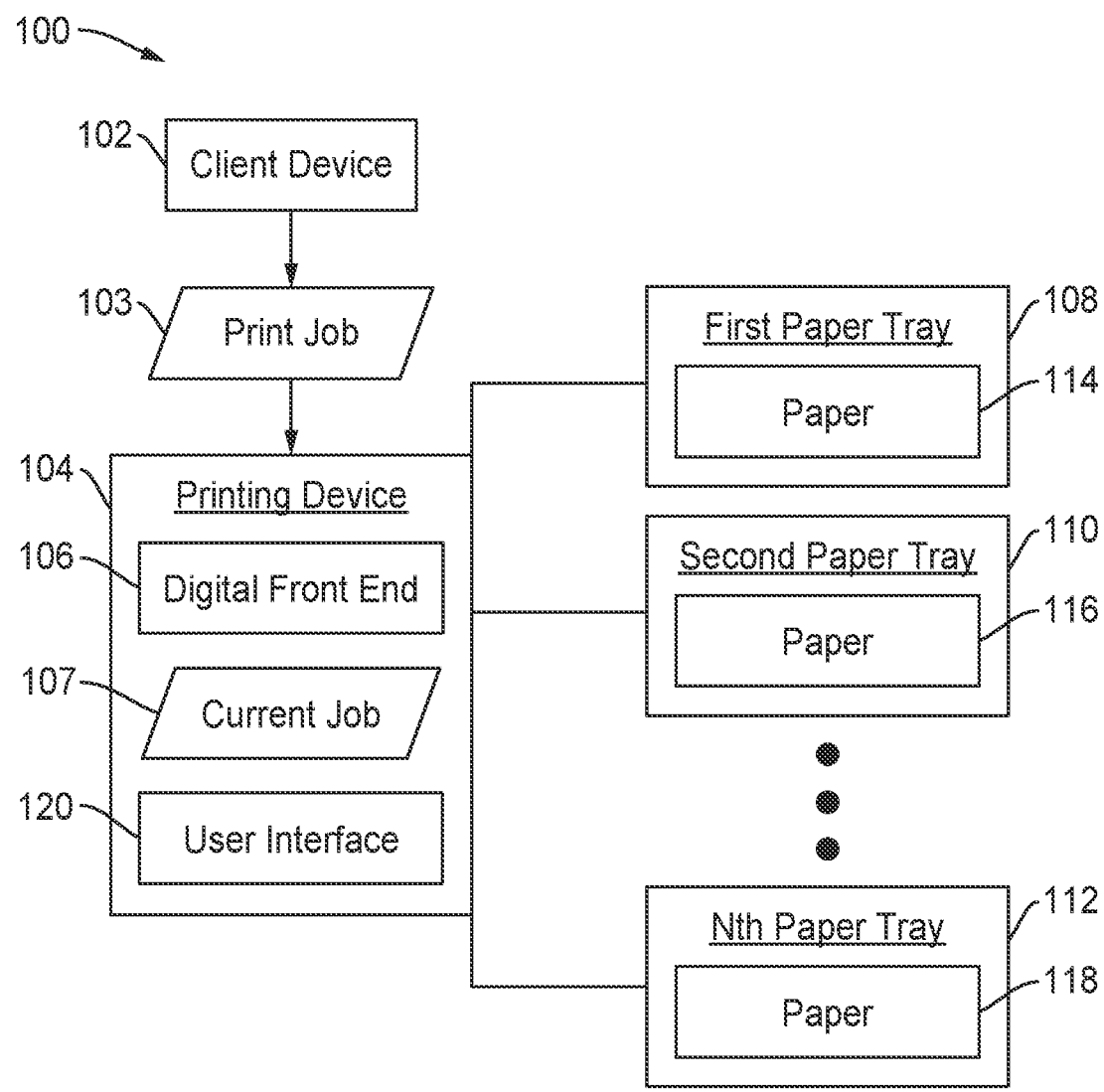
FIG. 1A illustrates a printing system having a printing device for printing documents according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments provide enhancements to how paper trays are configured in production printing devices. The disclosed embodiments would allow operators to configure trays in the usual manner. The operator opens the tray, after which a user interface prompts for a tray setting. The operator makes changes to the configuration of the tray and closes the tray. Alternatively, the operator may open the tray, load paper, close the tray, and update the tray settings. In either scenario, tray settings are immediately applied. These features may be presented to the operator in either the operations panel of the printing device or the user interface for the digital front end (DFE). In some embodiments, the operator updates tray settings, and then opens the tray, loads paper, and closes the tray.

For production printing devices, this process may be problematic as these devices should be printing as close to non-stop as possible. Specifically, a window exists in which the paper loaded in the tray and the tray configuration are mismatched. This issue is not a problem if the mismatch involves different paper sizes as the printing device will detect this condition. If the paper mismatch, however, does not involve a change in paper dimensions, then the printing device cannot detect this condition. A possibility exists for a print job to start printing operations with the incorrect paper.

It should be noted that many production printing devices are in environments where a substantial portion of jobs arrive with complete print ticketing. These print jobs will automatically start printing if the required paper is loaded in the printing device. If tray configuration and the loaded papers are mismatched, then it is possible for print jobs to print using the wrong paper.

In order to prevent the above situation, the operator has to remember to always open the tray before changing tray settings to ensure that a print job does not inadvertently print using the wrong paper or paper media. This feature, however, may negatively impact press productivity. Further, reliance on the operator is not ideal as not all operators will be as diligent as required.

In order to address these shortfalls, the disclosed embodiments propose the following enhancements to the tray configuration workflow. Some embodiments add an option to delay tray reconfiguration until after the tray is opened. The operator may define updated paper tray settings in a known manner. The disclosed embodiments will retain those settings and monitor the tray status. When the tray is opened for the operator to load new paper, the disclosed embodiments will reconfigure the one or more trays. Delay of reconfiguration of the tray until the tray is actually opened eliminates the window during which the paper tray and paper are mismatched. This feature makes it very unlikely for a print job to match a tray that does not have the correct paper.

If the printing system provides the delay option as the only available option, then the operator does not have to worry about the sequence of events. The operator reconfigures the tray and loads the paper at his/her convenience. Further, the operator may change the tray reconfiguration if an issue necessitates use of a different paper. The operator also may wish to cancel the proposed reconfiguration of the paper tray. The delay option provides the ability to do so.

Another option may be to delay tray reconfiguration until the current job completes printing. The operator may define updated paper tray settings as usual. The disclosed embodiments may retain the settings and monitor progress for the current print job. When the current print job is completed, the printing system reconfigures the paper tray with the new settings. If supported by the hardware in the printing device, then the printing system disengages the tray so that it may not be used for printing until it is opened and closed.

Alternatively, this option may be combined with the delay option disclosed above. When the options are combined, the printing system will know not to reconfigure trays that are opened or closed while the current job is still active. This feature may prevent tray reconfiguration in case that the current job runs out of paper. Further, the printing system may provide the operator the option to automatically reconfigure the print job to match the paper requirements for the next print job. This feature would eliminate the need for the operator to do any tray reconfiguration. Instead, when the current job finishes, the operator may be asked to load the required paper per job requirements.

When the operator opens the tray to load the paper, the printing system automatically will reconfigure the tray. This feature will make it very unlikely that the operator misconfigures the paper trays. In addition, this feature will make the operator use the printing device in a more efficient manner because the operator needs only to load the required paper. The printing device may handle all of the reconfiguration including knowing when to reconfigure the tray automatically.

In some embodiments, the printing system may implement these features using trays that are not currently in use with the current print job. The printing system may automatically select the settings based on the requirements for a subsequent print job thereby eliminating the need for the operator to actually define paper tray settings. This feature streamlines the process of getting the printing device ready for the subsequent print job while the current print job is printing.

FIG. 1A depicts a printing system 100 for printing documents according to the disclosed embodiments. Printing system 100 includes printing device 104. Printing device 104 is disclosed in greater detail below. Printing device 104 may receive one or more print jobs 103 within printing system 100. For example, client device 102 may generate and send print job 103 to printing device 104. In some embodiments, printing device 104 may be a production printing device in that print jobs are provided through client device 102, which is attached to the printing device. Such a print job may require 1000s of pages or even 100,000 pages or more.

Printing device 104 may receive print job 103 as it is processing and printing current job 107. Current job 107 may use different paper or media than print job 103. As such, printing device 104 may include a plurality of paper trays to supply papers of various types, sizes, weights, and the like. Thus, printing device 104 includes first paper tray 108 having paper 114, second paper tray 110 having paper 116, and so on to Nth paper tray 112 having paper 118. Current job 107 may use paper from one or more of these paper trays. In some embodiments, paper 114, paper 116, and paper 118 are different types of paper or different media.

For example, current job 107 may use paper 116 from second paper tray 110 while print job 103 may require paper 114 from first paper tray 108. As printing device 104 prints jobs, it also runs out of paper such that the trays need to be refilled. An operator opens the paper tray to refill the paper or add a different paper based on need. User interface 120 may provide a prompt for one or more settings for the paper tray. The operator may use user interface 120 to update the paper tray settings. For example, current job 107 may require paper 116, which is a specific size, such as A4. The current paper in second paper tray 110 is not A4 so the operator would open the second paper tray to place paper 116 therein. Settings for second paper tray 110 would be updated to indicate that it currently includes A4 paper using user interface 120.

User interface 120 may be in operation panel 208, disclosed below, or part of digital front end (DFE) 106. DFE 106 is disclosed in greater detail below. DFE 106 may process print jobs and act as a controller for printing device 104. Alternatively, user interface 120 may be displayed on client device 102.

Figure 1B:
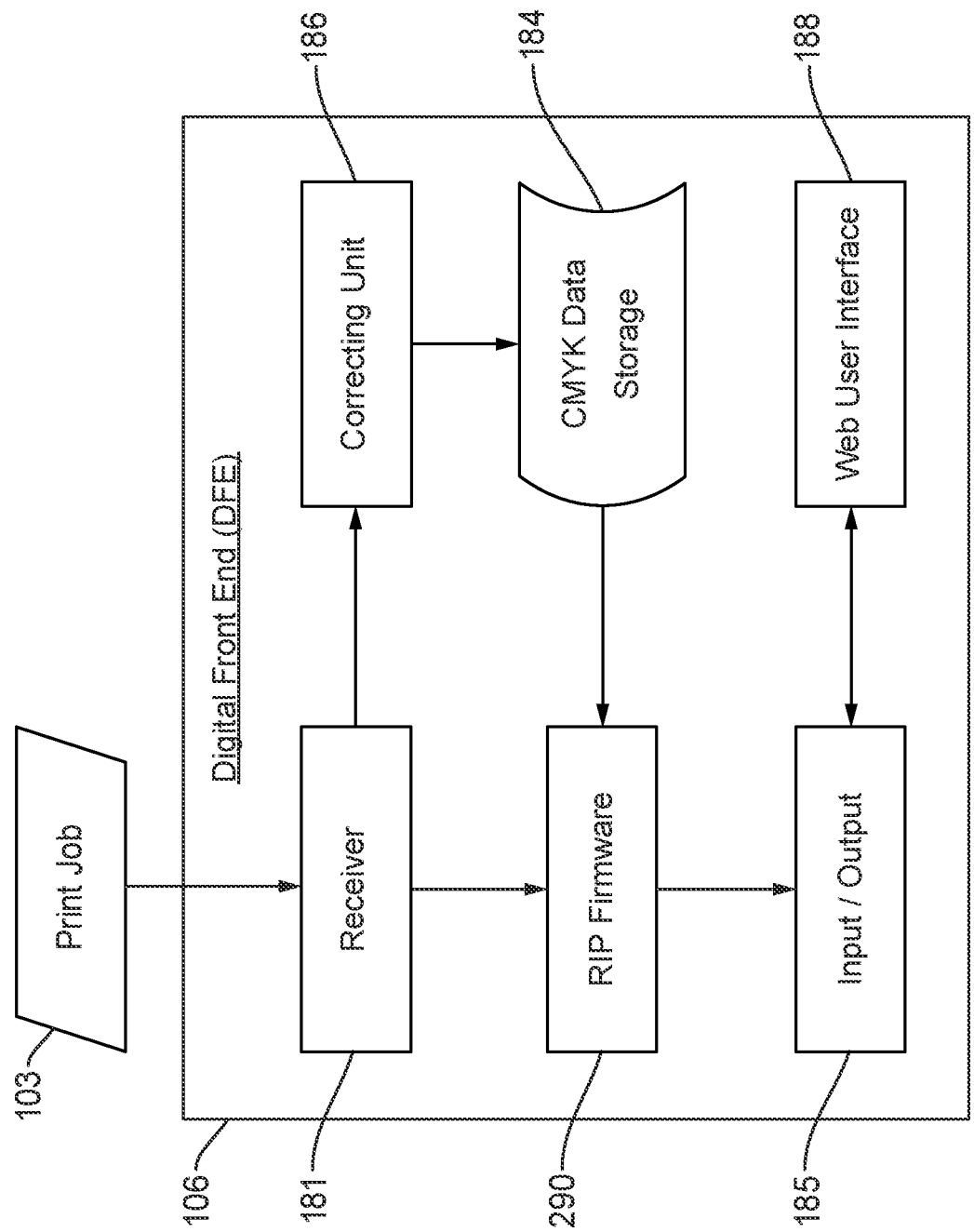
FIG. 1B illustrates a digital front end (DFE) for a printing device according to the disclosed embodiments.

FIG. 1B depicts a block diagram of DFE 106 according to the disclosed embodiments. DFE 106 includes a receiver 181, a RIP firmware 290, a CMYK data storage 184, an input/output connector 185, and a correcting unit 186. Additional components within DFE 106 may be implemented.

Receiver 181 receives print job 103 received within system 100 and outputs the print job to RIP firmware 290. Receiver 181 also may receive color information for the document or documents within the print job. It may output the color information to correcting unit 186. The print job received by receiver 181 is associated with image data to be printed on print media. It also may include print condition information including information for indicating single-sided printing or two-sided printing or print medium-type information along with other data associated with the print job.

RIP firmware 290 converts image data associated with the print job into raster data to thereby generate rendering data, and outputs the generated rendering data. RIP firmware 290 also converts the rendering data into rendering data in a CMYK format. When the rendering data is originally in the CMYK format, or CMYK rendering data, the conversion may not be performed. RIP firmware 290 may perform gradation conversion of the CMYK rendering data, with reference to one or more tone reproduction curves (TRCs). A TRC refers to data indicating the relationship between a colored gradation value for rendering data and print color, or print density, on a given print medium.

When print color provided alters over time, the TRCs stored in CMYK data storage 184 may be each deviated from an actually measured relationship between a colored value and print color. When the TRC is shifted from the actual relationship, gradation conversion for each colored gradation value cannot match a desired print color. In this regard, correcting unit 186 corrects the deviation, from the actual relationship, of the TRC stored in CMYK data storage 184 in order to allow each colored gradation value to match a desired print color. Correcting unit 186 converts RGB color information obtained through receiver 181 into CMYK color information. Correcting unit 186 may use the converted CMYK color information to generate the TRC. The TRC stored in CMYK data storage 184 is replaced with the generated TRC. Correcting unit 186 may correct the TRC. Correcting unit 186 may rewrite a part of the TRC stored in CMYK data storage 184 to thereby correct the TRC.

The rendering data generated by RIP firmware 290 may be transmitted within printing system 100 via input/output connector 185. The print condition information and the print medium type, as well as the rendering data, may be transmitted to a selected printing device within printing system 100. As disclosed above, the rendered data may be in a file format acceptable for a printing device such that the print job is provided directly to the print engine of the printing device.

DFE 106 also includes web user interface 188 that may communicate with other devices within printing system 100, if it is located at a separate device, using, for example, input/output connector 185. Web user interface 188, or web application, allows a user of the DFEs of other printing devices to interact with content or software running on DFE 106.

Figure 2:
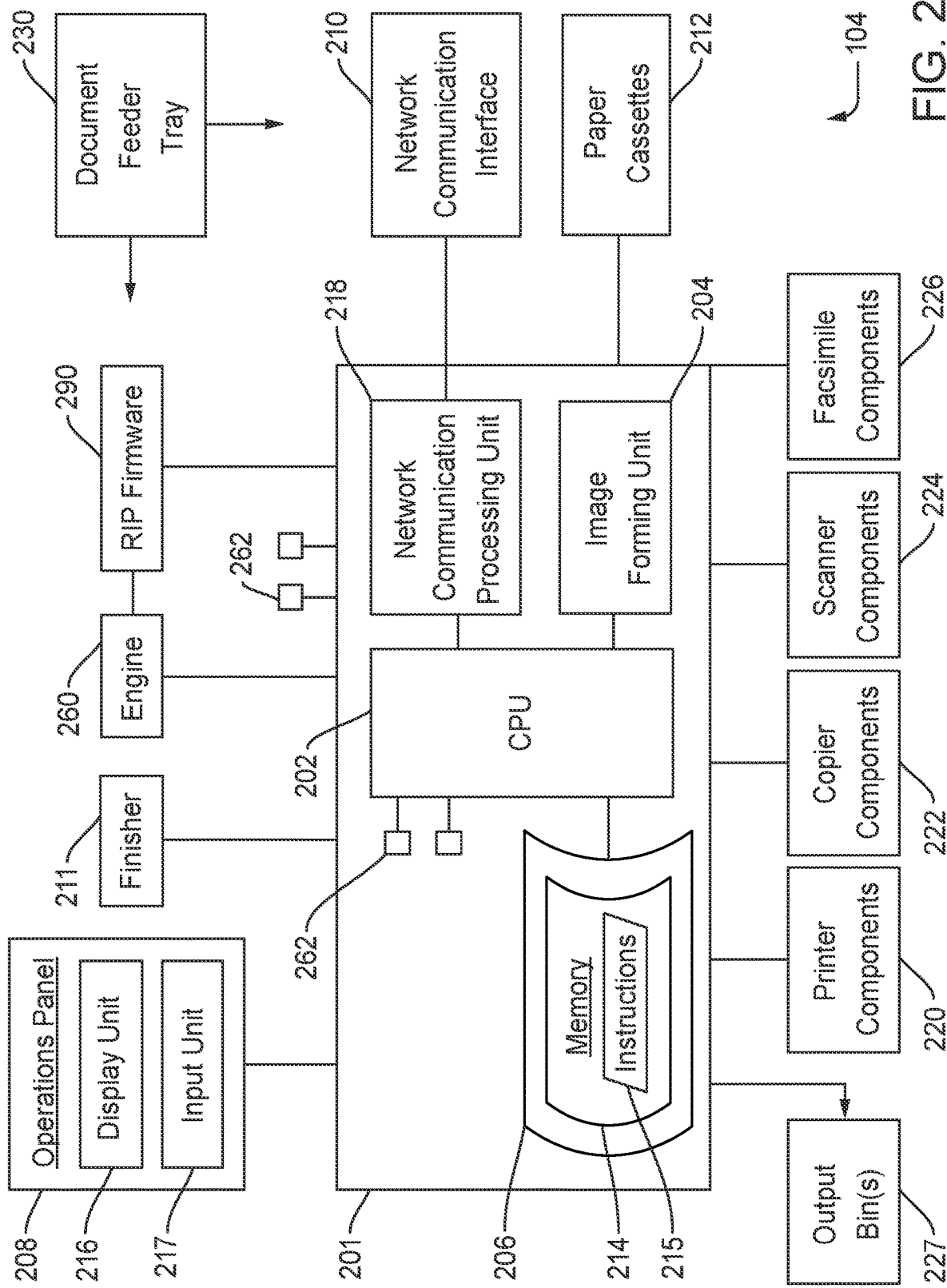
FIG. 2 illustrates a block diagram of components of the printing device for use within the printing system according to the disclosed embodiments.

FIG. 2 depicts a block diagram of components of printing device 104 according to the disclosed embodiments. The architecture shown in FIG. 2 may apply to any multifunctional printing device or image forming apparatus that performs various functions, such as printing, scanning, storing, copying, and the like within system 100. As disclosed above, printing device 104 may send and receive data from DFE 106 and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 also may be known as paper trays, shown as paper trays 108, 110, and 112 in FIG. 1A. Paper cassettes 212 may include papers having various sizes, colors, composition, and the like. Papers or media within paper cassettes 212 may be considered "loaded" onto printing device 104. The information for printing these papers may be captured in a paper catalog stored at DFE 106. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused. The output bins may include one or more output trays.

Document processor input feeder tray 230 may include the physical components of printing device 104 to receive papers and documents to be processed. Feeder tray also may refer to one or more input trays for printing device 104. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with print engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Display unit 216 also may serve as to display results from DFE 106, if applicable. DFE 106 may send calibration and paper catalog information to printing device 104 for display. For example, the operator at DFE 106 may send a calibration to printing device 104. Printing device 104 displays paper type and any other information needed to complete the calibration.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes print engine 260, as disclosed above. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of ink or toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device. Memory unit 206 may store the history of failure events and occurred errors with a timestamp of each error.

Printing device 104 communicates with other devices within system 100 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from DFE 106 as well as other devices within system 100.

Figure 3:
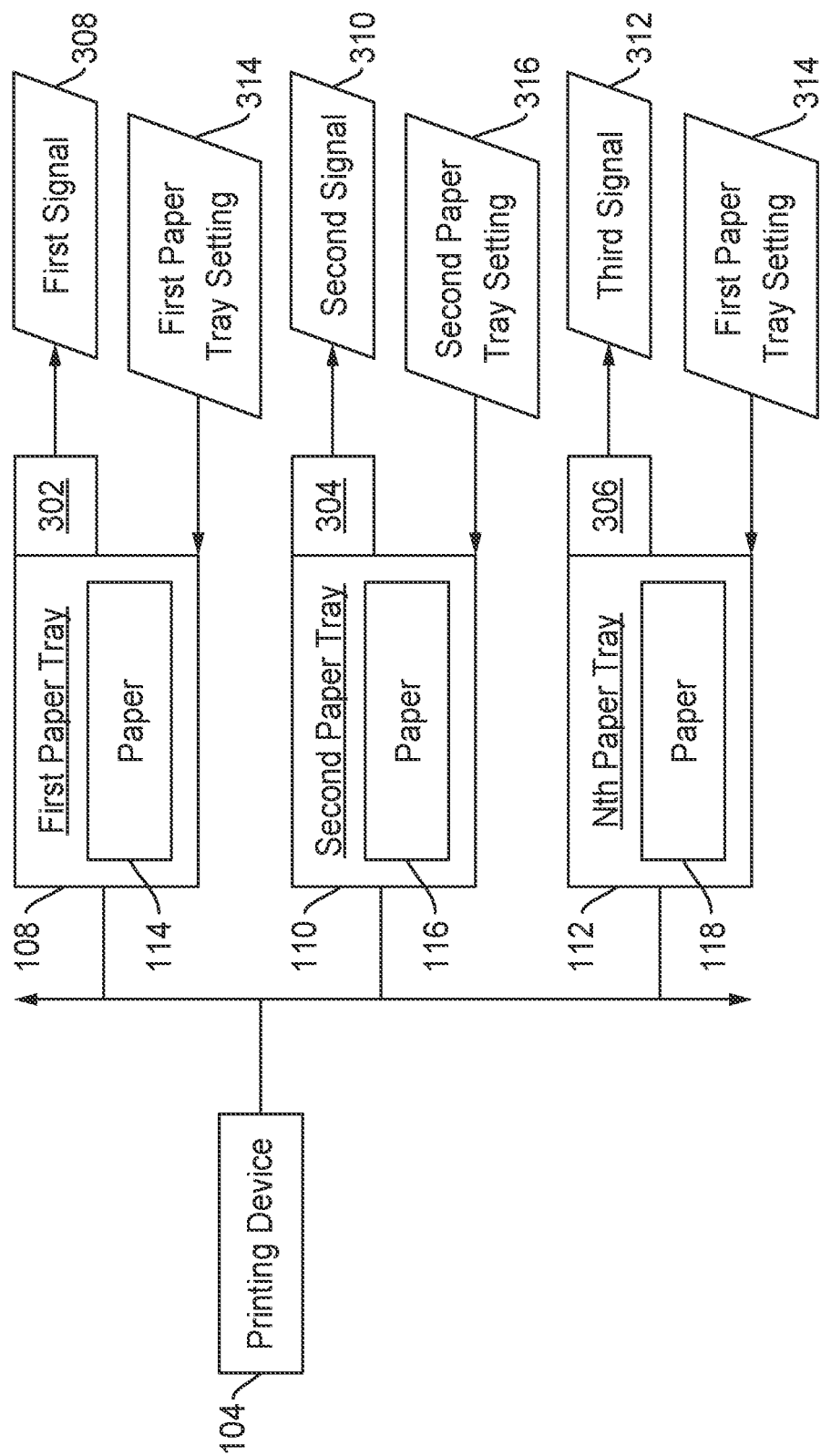
FIG. 3 illustrates a block diagram of the paper trays on the printing device in greater detail according to the disclosed embodiments.

FIG. 3 depicts a block diagram of the paper trays on printing device 104 in greater detail according to the disclosed embodiments. FIG. 3 shows first paper tray 108 having paper 114, second paper tray 110 having paper 116, and Nth paper tray 112 having paper 118. The paper trays may be opened, removed, or replaced on printing device 104. For example, first paper tray 108 may be opened or removed to add paper 114 for printing operations at printing device 104.

To indicate when paper trays are opened or removed, printing device 104 may includes sensors to determine whether the respective paper trays are closed or installed. Thus, sensor 302 may determine whether first paper tray 108 is installed onto printing device 104. When first paper tray 108 is opened, sensor 302 may detect this action and generate first signal 308. First signal 308 may be sent to DFE 106 to indicate that first paper tray is opened. First signal 308 also may be used by the disclosed embodiments to update the paper tray setting for first paper tray 108.

Thus, the operator may generate first paper tray setting 314 using user interface 120. First paper tray setting 314 may be held by DFE 106, or another controller component within printing system 100, such as an application on client device 102. Upon receipt of first signal 308 that first paper tray 108 is opened to load paper 114, the disclosed embodiments reconfigure first paper tray 108 to apply first paper tray setting 314. Thus, reconfiguration of the paper tray setting is delayed include the associated paper tray is opened for the operator to load new paper. This feature prevents or eliminates the time during which the paper tray and paper are mismatched.

With regard to second paper tray 110, sensor 304 determines when the second paper tray is opened, removed, or replaced. When one of these actions occurs, sensor 304 may generate second signal 310. For example, second paper tray 110 is opened to load paper 116. Sensor 304 sends second signal 310 to DFE 106. Any paper tray setting for second paper tray 110 may be applied at this time. Using the example, the disclosed embodiments reconfigure second paper tray 110 to apply second paper tray setting 316. Second paper tray setting 316 may differ from first paper tray setting 314 in that the settings are not applied at the same time, but only after the respective paper trays are opened.

Nth paper tray 112 may be in a paper tray group with first paper tray 108. Thus, Nth paper tray 112 also is reconfigured to apply first paper tray setting 314. Sensor 306 determines when Nth paper tray 112 is opened, removed, or replaced to load paper 118. In this example, the paper from paper 118 may be the same as the paper for paper 114. Nth paper tray 112, however, is not reconfigured to apply first paper tray setting 314 along with first paper tray 108 but when sensor 306 sends third signal 312 that the Nth paper tray is opened to load paper 118. This feature allows paper trays within a group to update their settings at different times to avoid mismatches between settings and papers.

After the delays and updates, printing device 104 may use the paper trays in printing operations using the updated paper tray settings. For example, first paper tray 108 is opened to load paper 114. First paper tray setting 314 is applied to reconfigure first paper tray 108. Print job 103 may require paper 114 having first paper tray setting 314. In other words, print job 103 may use paper 114 from first paper tray 108. A few minutes later, Nth paper tray 112 is opened to load paper 118, which may be similar to paper 114. Sensor 306 sends third signal 312 that Nth paper tray 112 is opened. The disclosed embodiments reconfigure Nth paper tray 112 to include first paper tray setting 314 so that printing operations may moved to the Nth paper tray when first paper tray 108 runs out of paper 114.

If the disclosed embodiments use the delay process to apply paper tray settings, then the operator does not need to worry about the sequence of events. The operator reconfigures the one or more trays with the paper tray setting then loads the paper at his/her convenience. At that time, the new paper tray setting is applied. Further, the operator may cancel or change the tray reconfiguration before the paper tray setting is applied should there be a change that necessitates use of different paper. For example, Nth paper tray 112 may be needed to complete current job 107. The operator may cancel application of first paper tray setting 314 and apply a different paper tray setting for paper 118, which differs from paper 114. When Nth paper tray 112 is opened to load paper 118, then the new paper tray setting is applied to reconfigure the Nth paper tray.

Figure 4:
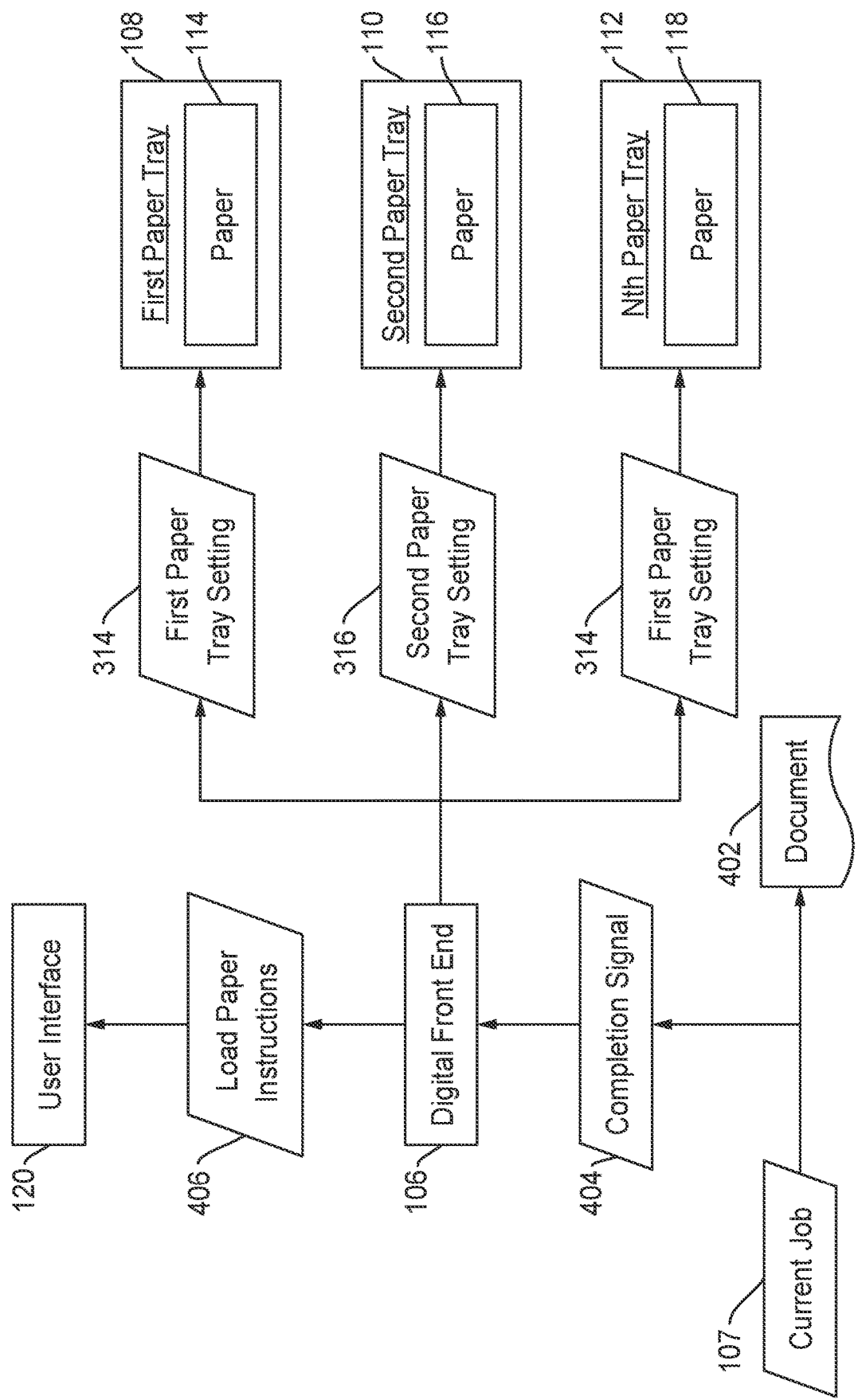
FIG. 4 illustrates another block diagram of the paper trays on the printing device in greater detail according to the disclosed embodiments.

FIG. 4 depicts another block diagram of the paper trays on printing device 104 in greater detail according to the disclosed embodiments. In these embodiments, configuration of the paper trays is delayed until after completion of current job 107. Current job 107 uses paper from one or more paper trays installed on printing device 104 that may be reconfigured using new paper tray settings. The paper tray settings, however, should not be applied until current printing operations are completed. Thus, DFE 106, or another component, such as a printer driver, may wait until document 402 is printed for current job 107 before updating paper tray settings.

Current job 107 results in document 402, printed using paper from one or more paper trays installed on printing device 104. After document 402 is printed, print engine 260 may generate a completion signal 404 to DFE 106 to let it know to provide the processed data for the next print job. Upon receipt of completion signal 404, DFE 106 also sends updated paper tray settings to the paper trays.

For example, using the features disclosed in FIG. 3, the operator may reconfigure first paper tray 108 with first paper tray setting 314. Upon completion of current job 107, first paper tray 108 is configured to apply first paper tray setting 314. Until that instance, first paper tray 108 may be disengaged from use in printing operations by printing device 104 until it is opened to load paper 114 that corresponds to first paper tray setting 314. First paper tray 108, for example, may not be used for a subsequent print job until paper 114 is loaded.

Second paper tray 110 may be reconfigured by second paper tray setting 316 after completion of current job 107. For example, second paper tray 110 may be supplying paper for current job 107. By delaying reconfiguration of second paper tray 110, a potential mismatch between second paper tray setting 316 and paper 116 is avoided. Further, the disclosed embodiments ensure that the paper needed for the subsequent print job is loaded into second paper tray 110 by delaying configuration of second paper tray setting 316.

Nth paper tray 112 also may be reconfigured to apply first paper tray setting 314 after completion of current job 107. First paper tray 108 and Nth paper tray 112 may receive first paper tray setting 314 at the same time. This feature may allow the operator to load all trays with the correct paper.

Alternatively, the disclosed embodiments may provide the operator the option to automatically reconfigure the paper trays to match the paper requirements for the next print job, or print job 103. This feature would eliminate the need for the operator to do any tray reconfiguration. Instead, when current job 107 finishes, the operator will be asked to load the required paper per job requirements.

DFE 106 may issue a load paper instruction 406 using user interface 120. DFE 106 also detects job settings for print job 103. Using the job settings, DFE 106 may generate the appropriate paper tray settings for the paper trays, which are reconfigured after completion of current job 107. Upon receipt of completion signal 404, DFE 106 may reconfigure the paper trays accordingly and have the operator load the appropriate papers in the proper paper trays. This feature may remove the potential for human error or oversight in updating paper trays. When the operator opens the paper tray to load the paper, the disclosed embodiments will automatically reconfigure the paper tray setting for the paper tray, as disclosed above.

In some embodiments, DFE 106 may not wait to reconfigure paper trays that are not being used for current job 107. For example, current job 107 may be using paper 114 and paper 118 from first paper tray 108 and Nth paper tray 112, respectively. Second paper tray 110 is idle. DFE 106 may determine that there is no need to wait until completion of current job 107 to update second paper tray 110 so it reconfigures the tray using second paper tray setting 316. DFE 106 also may issue load paper instruction 406 to the operator. Once second paper tray 110 is opened, DFE 106 may reconfigure the paper tray using second paper tray setting 316. Meanwhile, first paper tray 108 and Nth paper tray 112 are processing current job 107. Their updates will occur later.

Figure 5:
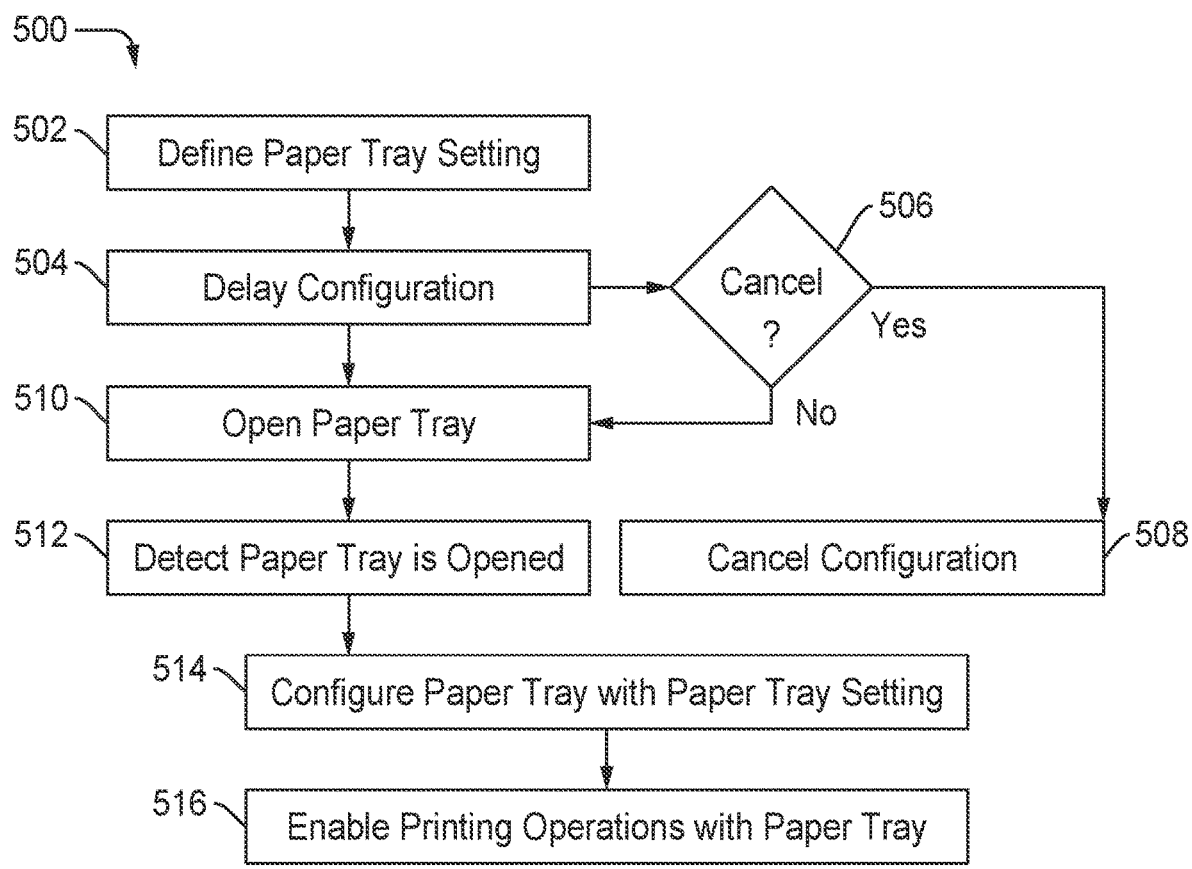
FIG. 5 illustrates a flowchart for reconfiguring a paper tray for printing operations according to the disclosed embodiments.

FIG. 5 depicts a flowchart 500 for reconfiguring a paper tray for printing operations according to the disclosed embodiments. Flowchart 500 may refer to FIGS. 1A-4 for illustrative purposes. Flowchart 500, however, is not limited to the embodiments disclosed by FIGS. 1A-4.

Step 502 executes by defining a paper tray setting for one or more paper trays at printing device 104. For example, first paper tray setting 314 may be defined for first paper tray 108 by the operator using user interface 120 or an application on client device 102. First paper tray setting 314 further may be defined for Nth paper tray 112. Step 504 executes by delaying configuration of first paper tray 108 using first paper tray setting 314.

While waiting for step 510 to execute, step 506 may execute by determining whether first paper tray setting 314 is cancelled by the operator. A cancellation may be initiated at user interface 120. If yes, then step 508 executes by cancelling configuration of first paper tray 108 using first paper tray setting 314. First paper tray 108 may implement its current settings. If step 506 is no, then flowchart 500 proceeds to step 510.

Step 510 executes by opening first paper tray 108 by the operator to load paper 114. Step 512 executes by detecting first paper tray 108 is opened. Sensor 302 detects first paper tray 108 is opened to load paper 114. Sensor 302 may generate first signal 308 to be sent to DFE 106 or another component within printing device 104 or printing system 100.

Now that first paper tray 108 has been opened, step 514 executes by configuring first paper tray 108 with first paper tray setting 314. DFE 106 may apply first paper tray setting 314 to reconfigure first paper tray 108 to use the new setting. More than one setting may be configured after opening first paper tray 108. Step 516 executes by enabling printing operations with first paper tray 108 having first paper tray setting 314.

Settings for the other paper trays, such as second paper tray 110 and Nth paper tray 112, may be implemented in the same manner. The operator may define the updated paper tray settings. The paper trays are configured to apply the settings after they have been opened, presumably to load the required paper or media corresponding the settings.

For example, print job 103 may call for glossy paper. The operator defines first paper tray setting 314 is glossy paper. Another setting may relate to the size of the paper. The disclosed embodiments delay configuration of first paper tray 108 as having glossy paper until it is opened to load the glossy paper for print job 103. This feature prevents the configuration of first paper tray 108 as having glossy paper, which may not have been loaded by the operator due to oversight.

Figure 6:
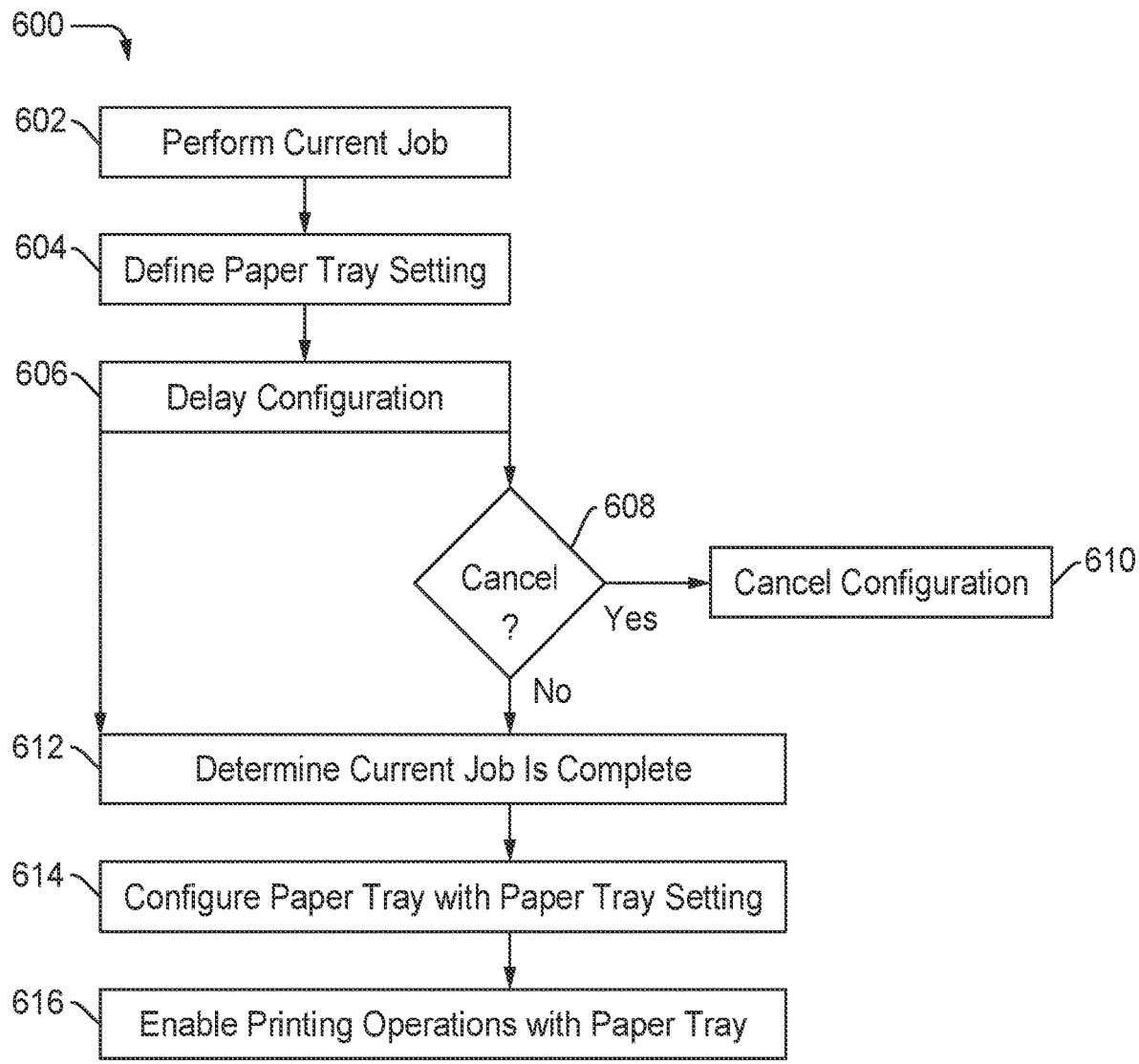
FIG. 6 illustrates a flowchart for reconfiguring a paper tray for printing operations according to the disclosed embodiments.

FIG. 6 depicts a flowchart 600 for reconfiguring a paper tray for printing operations according to the disclosed embodiments. Flowchart 600 may refer to FIGS. 1A-5 for illustrative purposes. Flowchart 600, however, is not limited to the embodiments disclosed by FIGS. 1A-5.

Step 602 executes by performing printing operations for current job 107 on printing device 104. Print engine 260 generates document 402 by printing sheets of paper for current job 107. Step 604 executes by defining a paper tray setting for one or more paper trays at printing device 104. Step 604 may correspond to step 502, disclosed above. In this example, second paper tray setting 316 for second paper tray 110 may be defined. Step 606 executes by delaying configuration of second paper tray 110 with second paper tray setting 316 while current job 107 is processing.

While waiting for step 612 to execute, step 608 may execute by determining whether second paper tray setting 316 is cancelled by the operator. A cancellation may be initiated at user interface 120. If yes, then step 610 executes by cancelling configuration of second paper tray 110 using second paper tray setting 316. Second paper tray 110 may implement its current settings. If step 608 is no, then flowchart 600 proceeds to step 612.

Step 612 executes by determining that current job 107 is complete at printing device 104. Print engine 260 may send completion signal 404 to DFE 106, which then indicates to other components (if needed) that current job 107 is complete. As a result, DFE 106 sends second paper tray setting 316 to configure second paper tray 110.

Now that current job 107 is complete, step 614 executes by configuring second paper tray 110 with second paper tray setting 316. DFE 106 may apply second paper tray setting 316 to reconfigure second paper tray 110 to use the new setting. More than one setting may be configured after completion of current job 107. Step 616 executes by enabling printing operations with second paper tray 110 having second paper tray setting 316.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A printing method comprising:
    defining an updated paper tray setting for a first paper tray of a plurality of paper trays at a printing device, wherein the updated paper tray setting modifies an existing paper tray setting for the first paper tray, and wherein the updated paper tray setting is related to a tray configuration for the plurality of paper trays stored at the printing device;
    delaying reconfiguration of the first paper tray with the updated paper tray setting;
    detecting that the at least one paper tray is opened after defining the updated paper tray setting;
    configuring the first paper tray with the updated paper tray setting; and
    enabling printing operations at the printing device with the first paper tray having the updated paper tray setting.

2. The method of claim 1, wherein the plurality of paper trays includes a set of paper trays having the first paper tray.

3. The method of claim 2, wherein configuring the first paper tray includes configuring the set of paper trays with the updated paper tray setting.

4. The method of claim 2, wherein the set of paper trays hold a print media.

5. The method of claim 1, further comprising cancelling the updated paper tray setting prior to detecting that the first paper tray is opened.

6. The method of claim 1, further comprising receiving the updated paper tray setting at an operation panel at the printing device or via a user interface for a digital front end (DFE) of the printing device.

7. The method of claim 1, further comprising further delaying configuration of the first paper tray with the updated paper tray setting until a current print job is complete.

8. A method for performing printing operations, the method comprising:

performing a current print job at a printing device;

defining an updated paper tray setting for a first paper tray of a plurality of paper trays at a printing device, wherein the updated paper tray setting modifies an existing paper tray setting for the first paper tray, and wherein the updated paper tray setting is related to a tray configuration for the plurality of paper trays stored at the printing device;

delaying reconfiguration of the first paper tray with the updated paper tray setting;

determining the current print job is complete at the printing device after defining the updated paper tray setting;

configuring the first paper tray with the updated paper tray setting; and enabling printing operations at the printing device with the configured first paper tray having the updated paper tray setting.

9. The method of claim 8, further comprising disengaging the first paper tray from printing operations after completion of the current print job.

10. The method of claim 9, further comprising detecting that the first paper tray is opened.

11. The method of claim 10, further comprising engaging the first paper tray in printing operations.

12. The method of claim 8, wherein the updated paper tray setting corresponds to a subsequent print job.

13. The method of claim 12, further comprising stopping printing operations for the subsequent print job until the first paper tray is configured with the updated paper tray setting.

14. The method of claim 8, further comprising receiving the updated paper tray setting at an operation panel at the printing device or via a user interface for a digital front end (DFE) of the printing device.

15. A method for performing printing operations, the method comprising:

performing a current print job at a printing device;

defining an updated paper tray setting applicable to a subsequent print job for a first paper tray of a plurality of paper trays at the printing device, wherein the updated paper tray setting modifies an existing paper tray setting for the first paper tray, and wherein the updated paper tray setting is related to a tray configuration for the plurality of paper trays stored at the printing device;

determining that the current print job is complete;

detecting the first paper tray is opened after defining the updated paper tray setting;

configuring the first paper tray with the updated paper tray setting; and performing printing operations for the subsequent print job using the updated paper tray setting.

16. The method of claim 15, further comprising prompting an operator to open the first paper tray.

17. The method of claim 15, further comprising determining the updated paper tray setting from a job setting of the subsequent print job.

18. The method of claim 15, further comprising determining the first paper tray is not being used for the current print job.

19. The method of claim 18, further comprising assigning the first paper tray to the subsequent print job.

* * * * *